United States Patent [19]

Hongo et al.

[11] Patent Number: 4,877,831

[45] Date of Patent: Oct. 31, 1989

[54] POLYCARBONATE RESIN COMPOSITION

[75] Inventors: Masafumi Hongo; Hideyuki Shigemitsu, both of Otake; Naoki Yamamoto, Hiroshima; Akira Yanagase, Otake, all of Japan

[73] Assignee: Mitsubishi Rayon Co., Ltd., Tokyo, Japan

[21] Appl. No.: 62,604

[22] Filed: Jun. 16, 1987

[30] Foreign Application Priority Data

Jun. 17, 1986 [JP] Japan ............................. 61-140636
Jul. 16, 1986 [JP] Japan ............................. 61-165537

[51] Int. Cl.$^4$ ..................... C08L 69/00; C08L 51/08
[52] U.S. Cl. .................................. 525/63; 525/439; 525/464; 525/446
[58] Field of Search ............... 525/439, 464, 479, 67, 525/63

[56] References Cited

U.S. PATENT DOCUMENTS

| | | |
|---|---|---|
| 3,864,428 | 2/1975 | Nakamura et al. |
| 4,522,979 | 6/1985 | Chung et al. ............... 525/439 |
| 4,690,986 | 9/1987 | Sasaki et al. ............... 525/479 |

FOREIGN PATENT DOCUMENTS

| | | |
|---|---|---|
| 3815225 | 3/1961 | Japan . |
| 48-29308 | 9/1973 | Japan . |
| 53-129246 | 11/1978 | Japan . |
| 55-9435 | 3/1980 | Japan . |
| 55-27579 | 7/1980 | Japan . |
| 57-12047 | 1/1982 | Japan . |
| 57-40536 | 3/1982 | Japan . |
| 57-21530 | 5/1982 | Japan . |
| 58-12300 | 3/1983 | Japan . |
| 58-149938 | 9/1983 | Japan . |
| 58-46269 | 10/1983 | Japan . |

*Primary Examiner*—Wilbert J. Briggs, Sr.
*Attorney, Agent, or Firm*—Cushman, Darby & Cushman

[57] ABSTRACT

A polycarbonate resin composition excellent in chemical resistance, weather resistance, heat resistance, and low-temperature impact resistance, which comprises, either a polycarbonate resin (A) or a mixture (A') of the polycarbonate resin and a saturated polyester and/or a polyester elastomer and either a siloxane based graft copolymer (B) obtained by graft polymerization of 95 to 10% by weight of at least one vinyl monomer onto 5 to 90% by weight of a polyorganosiloxane rubber which exhibits a degree of swelling of 3 to 30 as measured to toluene at 25° C., contains constitutional units derived from a graft-linking agent, and has an average particle size of 0.08 to 0.8 μm or a mixture (B) of the siloxane-based graft copolymer and a vinyl polymer, wherein the component (B) is blended so that the content of the polyorganosiloxane rubber may be from 0.5 to 60% by weight based on the whole resin composition.

10 Claims, 1 Drawing Sheet

POLYCARBONATE RESIN COMPOSITION

BACKGROUND OF THE INVENTION

1. Field of the Invention

The present invention relates to a polycarbonate resin composition superior in chemical resistance, weather resistance, heat resistance, and low-temperature impact resistance.

2. Description of the Prior Art

Polycarbonate resins are widely used as thermoplastic resins superior in heat resistance and impact resistance. However, their applications have been restricted, because the impact resistance thereof at temperatures of up to 0° C. is low on account of the polymer structure thereof and the impact resistance of molded articles thereof varies largely with the thickness of the articles and by some other reasons. Therefore, various methods have so far been proposed for correcting these drawbacks. For instance, methods of blending ABS resins with polycarbonate resins are disclosed in Japanese Patent Publication Nos. 15225/63, 27579/80, 21530/82, 12300/83, and 46269/83 and Japanese Patent Application Laid-Open Nos. 40536/82, 149938/83, and 12047/82. It is also disclosed in Japanese Patent Publication No. 29308/73 that a composition comprising a polycarbonate resin and a resin containing an acrylate copolymer is superior in weather resistance and craze resistance. While also various methods have hitherto been proposed for improvements of aromatic polycarbonate resins and aromatic polyester resins in mechanical and thermal properties, combinations of only both the resins are inferior in impact resistance and some other properties. Hence, Japanese Patent Publication No. 9435/80 (corresponding to U.S. Pat. No. 3,864,428), for example, has proposed a resin composition comprising an aromatic polyester resin, an aromatic polycarbonate resin, and a butadiene-based graft copolymer. Such a resin composition, although successful to a certain extent in the improvement of impact resistance, has the drawback of being essentially inferior in weather resistance. Japanese Patent Application Laid-Open No. 129246/78 discloses that molded articles superior in weather resistance and impact resistance are obtained from a blend of an acrylate copolymer with an aromatic polycarbonate resin and an aromatic polyester resin, but these molded articles have also the drawback of being inferior in impact resistance at low temperatures.

As stated above, a variety of methods are proposed for modifications of aromatic polycarbonate resins or of aromatic polycarbonate-aromatic polyester resin mixtures, but resins improved thereby in impact resistance may have deteriorated weather resistance and those improved in weather resistance may be insufficient in impact resistance. Thus, none of the improvements proposed up to now provide resins or resin compositions having well-balanced properties as a whole.

On the other hand, there are great expectations of organic materials in the automotive, electronic, and electrical fields, that is to say, there are needs for organic materials having higher functions and for diversified organic materials different in function. Particularly for automotive exterior applications and the like, where mostly metals have so far been used, there is demand for a resin which is satisfactory in impact resistance, weather resistance, heat resistance, etc. However, such demand has not been fulfilled so that the use of resins is restricted today for applications where it is required for resins to exhibit high performance characteristics under harsh environmental conditions.

SUMMARY OF THE INVENTION

The present inventors made intensive studies for the purpose of solving the above noted problems. As a result, it has been found that a thermoplastic resin composition superior in heat stability and impact resistance, particularly low-temperature impact resistance, as well as excellent in weather resistance and chemical resistance can be obtained by blending a graft copolymer produced by graft polymerization of a vinyl monomer onto a polyorganosiloxane rubber, with a polycarbonate resin alone or a mixture of the polycarbonate resin and a saturated polyester resin and/or a polyester elastomer. Based on this finding, the present invention has been accomplished.

BRIEF DESCRIPTION OF THE DRAWING

In the drawing, 1 is a molded resin article, 2 is a thinner applied, 3 is a fulcrum, and 4 is a load of 150 gf. The distance between the fulcrum and the loading point is 85 mm.

DETAILED DESCRIPTION OF THE INVENTION

Thus, the polycarbonate resin composition of the invention comprises (i) either a polycarbonate resin (A) or a mixture (A') of the polycarbonate resin and a saturated polyester resin and/or a polyester elastomer and (ii) either a siloxane-based graft copolymer (B) obtained by graft polymerization of 95 to 10% by weight of at least one vinyl monomer onto 5 to 90% by weight of a polyorganosiloxane rubber which exhibits a degree of swelling of 3 to 30 as measured in toluene, contains constitutional units derived from a graft-linking agent, and has an average particle size of 0.08 to 0.8 $\mu$m or a mixture (B) of the siloxane-based graft copolymer and a vinyl polymer, wherein the component (B) is blended so that the content of the polyorganosiloxane rubber may be from 0.5 to 60% by weight based on the whole resin composition.

The polycarbonate resin (A) in the invention is produced by using a dihydroxydiarylalkane as main starting material and optionally has branched chains. Such polycarbonate resins are manufactured by known processes and generally by the reaction of a dihydroxy compound and/or a polyhydroxy compound with either phosgene or a diester of carbonic acid. Suitable dihydroxydiarylalkanes include those having at least one alkyl group, chlorine atom, or bromine atom in any of the positions ortho to the hydroxyl groups. Preferred examples of the dihydroxydiarylalkane include 4,4'-dihydroxy-2,2-diphenylpropane (bisphenol A), tetramethylbisphenol A, and bis-(4-hydroxyphenyl)-p-diisopropylbenzene. The branched polycarbonate resin can be produced, for instance, by the above-mentioned reaction but using, for example, 0.2 to 2 mole % of a polyhydroxy compound in place of a part of the dihydroxy compound. Examples of the polyhydroxy compound include 1,4-bis-(4',4,2-dihydroxytriphenylmethyl)-benzene, phloroglucinol, 4,6-dimethyl-2,4,6-tris-(4-hydroxyphenyl)-heptene-2,4,6-dimethyl-2,4,6-tris-(4-hydroxy- phenyl)-heptane, 1,3,5-tris-(4-hydroxyphenyl)-benzene, 1,1,1-tris-(4- hydroxyphenyl)-ethane, and 2,2-bis-[4,4-(4,4'-dihydroxyphenyl)-cyclohexyl]-propane. Particularly preferred polycarbonate resins are of the bisphenol A type.

The saturated polyester resin for use in the mixture (A') of the saturated polyester resin and/or a polyester elastomer with the polycarbonate resin can be obtained by condensation mainly of an aromatic dicarboxylic acid or an ester-forming derivative thereof with an alkylene glycol. That is, the polyester is produced by reacting a dicarboxylic acid, e.g. terephthalic acid, isophthalic acid, or naphthalenedicarboxylic acid with a glycol, e.g. ethylene glycol, propylene glycol, tetramethylene glycol, or hexamethylene glycol, where small amounts of other dicarboxylic acid and glycol may be copolymerized as occasion demands. Preferred saturated polyester resins are polytetramethylene terephthalate, polyethylene terephthalate, and mixtures thereof.

The polyester elastomer for use as a component in the invention is a block copolymer consisting of high-melting polyester segments and low-melting polymer segments having molecular weights of 400 to 20,000. The high-melting polyester segment consists of a polyester obtained by condensation of an aromatic dicarboxylic acid with an alkylene glycol. Examples of this segment are as cited above in the case of the saturated polyester. Preferred examples of this segment are those of polytetramethylene terephthalate and of polyethylene terephthalate. On the other hand, the low-melting polymer segment consists of; a polyalkylene ether glycol, e.g. poly(ethylene oxide) glycol, poly(tetramethylene oxide) glycol, poly(propylene oxide) glycol, or a mixture thereof; an aliphatic polyester, e.g. a polyester resulting from the reaction of an aliphatic dicarboxylic acid of 2 to 12 carbon atoms with an aliphatic glycol of 2 to 10 carbon atoms, more specifically, polyethylene adipate, polytetramethylene adipate, polyethylene sebacate, polyneopentyl sebacate, polyhexamethylene azelate, or poly-ε-caprolactone. The content of the low-melting polymer segment in the polyester elastomer is desirably from 2 to 80% by weight.

The siloxane-based graft copolymer constituting the component (B) used in the present invention consists of 5 to 90% by weight of a polyorganosiloxane rubber and 95 to 10% by weight of at least one vinyl monomer. The polyorganosiloxane rubber used herein is obtained by polymerization, preferably emulsion polymerization, of three ingredients: an organosiloxane, a graft-linking agent, and a crosslinking agent. The organosiloxane is a compound having siloxane units each represented by $R^3R^4SiO$ ($R^3$ and $R^4$ denote methyl, ethyl, propyl or phenyl). Examples of the organosiloxane include hexamethylcyclotrisiloxane, octamethylcyclotetrasiloxane, decamethylcyclopentasiloxane, dodecamethylcyclohexasiloxane, trimethylphenylcyclotrisiloxane, tetramethyltetraphenylcyclotetrasiloxane, and octaphenylcyclotetrasiloxane. The organosiloxane is used in an amount of 60 to 99.8% by weight based on the polyorganosiloxane rubber.

The graft-linking agent for use herein is a compound capable of forming a unit represented by any of the general formulae:

(I)

(II)

(III)

wherein; $R^1$ denotes methyl, ethyl, propyl, or phenyl; $R^2$ denotes hydrogen or methyl; n denotes a number of 0, 1, or 2; and p denotes an integer of 1 to 6. In particular, (meth)acryloyloxysiloxanes, capable of forming a unit of formula (I), are preferable in that they give high graft efficiency and hence permit effective formation of graft chains, thus favoring the impact resistance. Methacryloyloxysiloxanes are most preferable. The graft-linking agent is added desirably in an amount of 0.1 to 20% by weight based on the polyorganosiloxane rubber. When the addition amount is less than 0.1% by weight, the graft polymerization proceeds insufficiently and the resulting graft copolymer tends to be inferior in the uniformity of dispersion in the resin composition. On the contrary, when the amount exceeds 20% by weight, the percentage of grafting increases but the polymerization degree of the resulting graft copolymer tends to decrease undesirably.

The crosslinking agent used is a trifunctional or tetrafunctional silane crosslinking agent, for example, trimethoxymethysilane, triethoxyphenylsilane, tetramethoxysilane, tetraethoxysilane, or tetrabutoxysilane. Of these silane crosslinking agents, preferred are tetrafunctional crosslinking agents and particularly preferred is tetraethoxysilane. The crosslinking agent is used in an amount of 0.1 to 40% by weight based on the polyorganosiloxane rubber. This amount should be chosen so that the degree of swelling of the resulting polyorganosiloxane rubber (the ratio by weight of toluene absorbed by polyorganosiloxane when it is saturated with toluene at 25° C. to the dry polyorganosiloxane) may be within the range of 3 to 30, preferably 3 to 25, particularly preferably 3 to 15. When the degree of swelling is less than 3, that is, the amount of crosslinking agent is too large, the polyorganosiloxane will not exhibit enough rubber elasticity. When the degree of swelling exceeds 30, the polyorganosiloxane cannot hold the domain structure thereof in the matrix resin and hence cannot impart impact resistance, thus achieving only effects equivalent to those produced by simple addition of polydimethylsiloxane. When the resin composition contains neither the saturated polyester nor the polyester elastomer, the degree of swelling exceeding 15 has a marked tendency to deteriorate the impact resistance. Tetrafunctional silane crosslinking agents are preferable to trifunctional silane crosslinking agents since the degree of swelling is more easily controllable within the above defined range when the former crosslinking agent is used.

The degree of swelling of the polyorganosiloxane rubber is determined in the following way: A polyorganosiloxane rubber latex is added to about from 3 to 5 times the volume thereof of isopropyl alcohol with stirring, thereby breaking the emulsion and coagulating the rubber to recover it. The thus obtained rubber is washed with water, and dried under reduced pressure at 80° C. for 10 hours. Thereafter, about 1 g of the rubber is precisely weighed out, and immersed in about 30 g of toluene at 25° C. for 100 hours to swell with toluene. Then the extra toluene is removed by decantation. The swelled rubber is weighed precisely, and dried under reduced pressure at 80° C. for 16 hours to evaporate and remove the absorbed toluene, and the resulting rubber is weighed again precisely. The degree of swelling is calculated according to the following equation:

$$\text{Degree of swelling} = \frac{\left(\begin{array}{c}\text{Weight of}\\ \text{swelled rubber}\end{array}\right) - \left(\begin{array}{c}\text{Weight of}\\ \text{dry rubber}\end{array}\right)}{(\text{Weight of dry rubber})}$$

The polyorganosiloxane rubber latex can be produced for instance, according to the methods described in U.S. Pat. Nos. 2,891,920 and 3,294,725. In an embodiment of the present invention, a mixture of the organosiloxane, graft-linking agent, and crosslinking agent is shear-mixed with water in the presence of a sulfonic acid type emulsifier such as alkylbenzenesulfonic acid, alkylsulfonic acid, or the like, thereby polymerizing the mixture to produce a polyorganosiloxane rubber latex. Alkylbenzenesulfonic acid is best suited since it acts not only as an emulsifier but also as a polymerization initiator. In this case, the joint use of a metal salt of alkylbenzenesulfonic acid or a metal salt of alkylsulfonic acid is preferable since it is effective in maintaining the polymer stable during the graft polymerization.

Rubber particle sizes in this organosiloxane rubber latex, which have significant effect on the impact resistance of the resin composition of the present invention, are desired to be in the range of 0.08 to 0.8 μm. When the particle sizes depart from this range, the impact resistance will tend to undesirably low.

Suitable vinyl monomers for graft polymerization onto the polyorganosiloxane rubber include styrene, α-methylstyrene, methyl methacrylate, 2-ethylhexyl methacrylate, ethyl acrylate, butyl acrylate, acrylonitrile, methacrylonitrile, ethylene, propylene, butadiene, isoprene, chloroprene, vinyl acetate, vinyl chloride, vinylidene chloride, allyl methacrylate, triallyl isocyanurate, ethylene dimethacrylate, and mixtures of these monomers. In particular, it is preferably to use at least one monomer selected from the group consisting of styrene, α-methylstyrene, acrylonitrile, methyl methacrylate, and butyl acrylate.

The respective proportions of the vinyl monomer and the polyorganosiloxane rubber, in the graft copolymer, are from 95 to 10% by weight and from 5 to 90% by weight. When the proportion of the polyorganosiloxane rubber is less than 5% by weight, the impact resistance of the resin composition of the present invention is not sufficiently high. When this proportion exceeds 90% by weight, the effect of the grafting will not be exhibited. If a mixture of the graft copolymer with a vinyl polymer is used, the mixing ratio should be controlled so as to give a polyorganosiloxane rubber content of 5 to 90% by weight based on the mixture.

The siloxane-based graft copolymer can be prepared by the technique of the single-stage or multi-stage radical polymerization of a vinyl monomer onto a polyorganosiloxane rubber in latex form which is prepared by the ordinary emulsion polymerization method. In this case, the percentage of grafting is desired to be at least 10%. It is preferable for enhancing the impact resistance that the ratio of the grafted vinyl monomer to the whole polymerized vinyl monomer, viz. graft efficiency be approximated to 100% as far as possible. This efficiency varies greatly with the kind of graft-linking agent used. In this respect, the polyorganosiloxane-based graft copolymer is preferably prepared by using (meth)acryloyloxysiloxane, which forms constitutional units represented by the above formula (I), as a graft-linking agent.

When a mixture of the polyorganosiloxane-based graft copolymer and a vinyl polymer is used as the component (B) in the resin composition of the present invention, the vinyl polymer is prepared by polymerizing 70 to 100% by weight of at least one monomer selected from the group consisting of aromatic vinyl monomers, vinyl cyanide monomers, and (meth)acrylate monomers and 30 to 0% by weight of a vinyl monomer copolymerizable therewith. Examples of the vinyl polymer include a polymer or copolymer of at least one member selected from the group consisting of styrene, α-methylstyrene, methylmethacrylate, ethyl acrylate, methyl acrylate, butyl acrylate, acrylonitrile, and methacrylonitrile and a copolymer of any of these monomers with up to 30% by weight of another vinyl monomer such as ethylene or vinyl acetate. Two or more of these vinyl polymers may be used in combination. These vinyl polymers are produced preferably by emulsion polymerization, which facilitates the grafting of various monomers.

As regards the blending proportions of the components of the resin composition of the present invention, the silane-based graft copolymer (B) is blended so that the polyorganosiloxane rubber content may be from 0.5 to 60% by weight based on the whole resin composition. When this content is less than 0.5% by weight, the effect of improving polycarbonate properties, particularly impact resistance and chemical resistance, which is produced by the present invention will be insufficient. On the contrary, when the content exceeds 60% by weight, the moldability is undesirably deteriorated.

When the resin composition of the present invention comprises the polycarbonate resin as component (A) and either the siloxane-based graft copolymer or a mixture thereof with the above-mentioned vinyl polymer, as component (B), it is preferable that 10 to 90 parts by weight of component (A) and 90 to 10 parts by weight of component (B) are blended in view of the chemical resistance and the impact resistance.

When the resin composition of the present invention comprises a mixture of the polycarbonate resin and the saturated polyester resin and/or the polyester elastomer, as component (A') and either the polyorganosiloxane-based graft copolymer or a mixture thereof with the vinyl polymer, as component (B), it is preferable that 1 to 99 parts by weight of polycarbonate resin, 99 to 1 parts by weight of the saturated polyester and/or the polyester elastomer, and the siloxane-based graft copolymer or a mixture thereof with the vinyl polymer are blended so that the content of the polyorganosiloxane rubber may be from 0.5 to 60% by weight based on the whole resin composition.

There is no particular restriction on the method for preparation of the resin composition of the present invention. It can be prepared according to various known techniques, for example; the method of blending the ingredients in powdery or granular form in a Henschel mixer, tumbler, or the like and then melt-mixing the blend in an extruder, kneader, mixer, or the like; the method of mixing a previously melted ingredient with other ingredients added consecutively; and the method of molding a mixture of the ingredients directly by means of an injection molding machine.

The polycarbonate resin composition of the present invention may contain, if necessary, additives selected from; light or heat stabilizers, e.g. phenolic antioxidants, phosphite antioxidants, ultra-violet absorbers, and amine light stabilizers; modifiers, e.g. hydrolysis-proofing agents of the epoxy family; known flame retardants; fillers, e.g. glass fiber, titanium oxide, and talc; dyes and pigments; plasticizers; and so forth.

The present invention is illustrated in more detail with reference to the following examples. In the following descriptions, parts and percentages are all by weight.

In the examples and comparative examples, properties were evaluated in the following ways unless otherwise noted.

Izod impact strength:

Izod impact strength, notched, was measured in accordance with ASTM D-256.

Heat distortion temperature:

Measured under a load of 18.56 kg/cm$^2$ in accordance with ASTM D-648.

Weather resistance:

The discoloration ($\Delta E$) of test specimens was measured in accordance with JIS Z-8730 after 1000 hour's exposure of the specimens in a Sunshine long-life weather meter at 83° C. without rain fall simulation.

Figure 1:
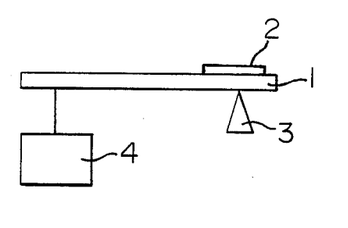
The accompanying drawing illustrates a cantilever test for measuring the chemical resistance of molded resin articles.

Chemical resistance:

A molded resin test specimen 1 (1/12 inch thick, ½ inch wide, 5 inches long) was fixed as shown in the accompanying drawing, an automotive paint thinner 2 (available from Nippon Paint Co., Ltd.) was applied on a portion abutting against the fulcrum 3, of the specimen, and it was subjected to a cantilever test, wherein the time to the break of the specimen was measured. In the drawing, 4 denotes a load of 150 gf and the distance between the fulcrum and the loading point is 85 mm.

REFERENCE EXAMPLE 1

Preparation of polyorganosiloxane latex I:

A mixture of 3 parts of tetraethoxysilane, 1 part of γ-methacryloyloxypropyldimethoxymethylsilane, and 96 parts of octamethylcyclotetrasiloxane was added to 300 parts of distilled water containing 1 part of dodecylbenzenesulfonic acid and 1 part of sodium dodecylbenzenesulfonate. After preliminary stirring in a homo-mixer at a revolution of 10,000 rpm, the mixture was emulsified by passing it twice through a homogenizer under a pressure of 300 kg/cm$^2$ giving a polyorganosiloxane latex. This latex was poured into a separable flask equipped with a condenser and a stirrer, and was heated with stirring at 85° C. for 4 hours and then cooled and left standing at 5° C. for 24 hours. This latex was neutralized with aqueous NaOH to pH 7.2, thus completing the polymerization to yield a polyorganosiloxane latex I. Polymerization yield: 91.2%; Solid content: 22.74%; Degree of swelling: 7.4; Average particle diameter: 0.15 μm.

REFERENCE EXAMPLE 2

Preparation of polyorganosiloxane latex II:

A mixture of 3 parts of tetraethoxysilane, 2 parts of γ-mercaptopropyldimethoxymethylsilane, and 95 parts of octamethylcyclotetrasiloxane was emulsified and polymerized according to the procedure of Reference Example 1. The resulting latex was neutralized with aqueous NaOH to pH 6.8, yielding a polyorganosiloxane latex II. Polymerization yield: 90.8%; Solid content: 22.64%; Degree of swelling: 6.9; Average particle diameter: 0.156 μm.

REFERENCE EXAMPLE 3

Preparation of polyorganosilane latex III:

A mixture of 3 parts of tetraethoxysilane, 2 parts of tetravinyltetramethylcyclotetrasiloxane, and 95 parts of octamethylcyclotetrasiloxane was emulsified and polymerized according to the procedure of Reference Example 1. The resulting latex was neutralized with aqueous NaOH to pH 7.0, yielding a polyorganosiloxane latex III. Polymerization yield: 91.6%; Solid content: 22.84%; Degree of swelling: 7.3; Average particle diameter: 0.152 μm.

REFERENCE EXAMPLE 4

Preparation of polyorganosiloxane-based graft copolymers S-1, S-2, and S-3:

Latexes I (263.9 parts, solid content 22.74%), II (265 parts, solid content 22.64%), and III (262.7 parts, solid content 22.84%) prepared in Reference Examples 1, 2, and 3, respectively, were placed each in a separable flask equipped with a stirrer. After air replacement with nitrogen, each latex was heated to 70° C. and then 10 parts of acrylonitrile, 30 parts of styrene, and 0.08 part of tert-butyl hydroperoxide were added and the mixture was stirred for 30 minutes. Further a solution of 0.12 part of Rongalite, 0.0002 part of ferrous sulfate, and 0.0006 parts of disodium ethylenediaminetetraacetate in 10 parts of water was added to initiate the radical polymerization. Stirring was continued for 1 hour until the heat of polymerization was no longer generated, and thereafter the reaction temperature was maintained for 4 hours. Then the polymerization was ended by cooling the reaction mixture. The respective yields of graft polymerizations were 97%, 98.4%, and 96.8%, the respective percentages of grafting 48%, 21%, and 18%, and the respective graft efficiencies 72%, 31.5%, and 27%. The obtained latexes were each added dropwise to a hot aqueous solution of 5 parts of calcium chloride dihydrate to coagulate the polymer, which was then separated and dried. Thus, dry powders of graft copolymers S-1, S-2, and S-3 were obtained.

EXAMPLES 1-6

A polycarbonate resin (supplied by Mitsubishi Chemical Industries Ltd. under the tradename of 7022 PJ), each of polyorganosiloxane-based graft copolymers S-1 through S-3 prepared in Reference Example 4, and each of vinyl polymers shown in Table 1 were mixed together in proportions as shown in Table 1 in a Henschel mixer for 4 minutes. Each blend was pelletized through a 30-mmφ twin-screw extruder at a cylinder temperature of 260° C. Specimens for testing properties were prepared from these pellets, and measured for properties. Results of the measurements are also shown in Table 1.

COMPARATIVE EXAMPLES 1-7

Blending, pelletizing, and evaluation of properties were conducted according to the procedure of Examples 1-6 except that a graft copolymer ABS-1 prepared by graft-polymerizing 10 parts of acrylonitrile and 30 parts of styrene onto 60 parts of polybutadiene according to the ordinary method and commercial rubber-modified resins were used each in place of the polyorganosiloxane-based graft copolymer and blended in proportions as shown in Table 1. Results of the evaluation are shown also in Table 1.

TABLE 1

| | | Example | | | | | | | Comparative Example | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 |
| Polycarbonate resin (parts) | | 80 | 60 | 50 | 55 | 57 | 55 | 60 | 80 | 55 | 65 | 57 | 65 | 100 |
| Polyorgano-siloxane-based graft copolymer (parts) | S-1 | 20 | 20 | 25 | 17 | | | | | | | | | |
| | S-2 | | | | | 23 | | | | | | | | |
| | S-3 | | | | | | 23 | | | | | | | |
| Rubber-modified resin (parts) | ABS resin Graft copolymer ABS-1 | | | | | | | 20 | | | | | | |
| | ABS resin Diapet 1002 (tradename) of Mitsubishi Rayon Co., Ltd. | | | | | | | | 20 | | | | | |
| | ASA resin Dialac S-700 (tradename) of Mitsubishi Rayon Co., Ltd. | | | | | | | | | 30 | 20 | | 25 | |
| | AES resin #110 (tradename) of Japan Synthetic Rubber Co., Ltd. | | | | | | | | | | | 33 | | |
| | AS resin Acrylonitrile (29%) - styrene (71%) copolymer by suspension polymerization | | 20 | | | 20 | 22 | 20 | | 15 | | | | |
| | MMA resin Methyl methacrylate (99%) - Methyl acrylate (1%) copolymer by suspension polymerization | | | 25 | | | | | | | | | | |
| | MMA resin Methyl methacrylate (60%) - Styrene (40%) copolymer by suspension polymerization | | | | 28 | | | | | | 15 | 10 | 10 | |
| Vinyl polymer (parts) | MS resin | | | | | | 10 | | | | | | | |
| Izod impact strength (kg·cm/cm) at 23° C. | | 65 | 48 | 33 | 35 | 37 | 41 | 45 | 67 | 37 | 37 | 35 | 43 | 12 |
| at −30° C. | | 40 | 34 | 23 | 25 | 30 | 31 | 30 | 42 | 7 | 9 | 8 | 30 | — |
| Heat Distortion temperature (°C.) | | 136 | 129 | 122 | 126 | 126 | 124 | 128 | 137 | 120 | 132 | 125 | 133 | 140 |
| Chemical resistance (Cantilever test) (minute) | | 14 | 18 | 21 | 17 | 19 | 20 | 1.5 | 1.2 | 2.5 | 2 | 2 | 1 | — |
| Weather resistance (ΔE) | | 9.8 | 10 | 10.2 | 9.6 | 10.3 | 10 | 19.5 | 23 | 20.2 | 18.4 | 21.2 | 19.8 | — |

EXAMPLE 7 AND COMPARATIVE EXAMPLE 8

164.9 Parts of the polyorganosiloxane latex prepared in Reference Example 1 was placed in a separable flask. After air replacement with nitrogen, the latex was heated to 80° C. and then a mixture of 62.5 parts of styrene and 0.25 part of tert-butyl peroxide was added and dispersed by stirring for 30 minutes. Further a solution of 0.4 part of Rongalite, 0.0006 part of ferrous sulfate, and 0.0015 part of disodium ethylenediaminetetraacetate in 10 parts of water was added to initiate the radial polymerization. The reaction temperature was maintained for 6 hours and then the polymerization was ended by cooling the reaction mixture. The resulting graft copolymer latex was added dropwise to a hot aqueous solution of 5 parts of calcium chloride dihydrate to coagulate the polymer, which was then separated, washed, and dried at 80° C. for 10 hours, giving a dry powder S-4.

The graft polymerization gave a styrene polymerization yield of 92.5%, a percentage of grafting of 91%, and a graft efficiency of 59%.

For comparison, a polyorganosiloxane latex was prepared according to the procedure of Reference Example 1 but without using γ-methacryloyloxypropyldimethoxymethylsilane that is a graft-linking agent. Using this latex, a polymer CS-1 was prepared according to the procedure of Example 7. The percentage of grafting in this case was 0%. These polymers S-4 and CS-1 were blended severally with the same polycarbonate resin as used in Example 1, in proportions as shown in Table 2. According to the procedure of Example 1, the blends were each pelletized and molded into test specimens for measuring the Izod impact strength. Found Izod impact strengths are also shown in Table 2.

TABLE 2

|  | Example 7 | Comparative Example 8 |
|---|---|---|
| Polycarbonate resin (parts) | 20 | 20 |
| Polymer  S-4 (parts)  CS-1 | 80 | 80 |
| Izod impact strength (kg · cm/cm) | 32 | 11 |

EXAMPLES 8–10 AND COMPARATIVE EXAMPLES 9–11

A bisphenol A type polycarbonate resin having molecular weight of about 25,000, polyethylene terephthalate having an intrinsic viscosity [η] of 0.98, AS resin of 25/75 acrylonitrile/styrene ratio by weight, and each of polyorganosiloxane-based graft copolymers S-1 and S-2 were blended together in proportions as shown in Table 3 in Henschel mixer for 4 minutes. The resulting blends were melt-mixed severally through a 30-mmφ twin-screw extruder at a cylinder temperature of 260° C. and formed into pellets, giving compositions of the present invention. Using these pellets, properties of the compositions were evaluated. Results of the evaluation are also shown in Table 3.

In comparative Examples 9 and 10, compositions were prepared in the same manner as in Example 8 but using (i) a graft copolymer ABS-1 prepared by graft-polymerizing 10 parts of acrylonitrile and 30 parts of styrene onto 60 parts of polybutadiene and (ii) an acrylic graft copolymer prepared by graft-polymerizing 10 parts of acrylonitrile and 30 parts of styrene onto 60 parts of an acrylic rubber of 92/7/1 butyl acrylate/styrene/triallyl isocyanurate ratio by weight, respectively, in place of the polyorganosiloxane-based graft copolymer.

Properties shown in the following tables were evaluated in the following ways: The Izod impact strength was measured in accordance with ASTM D-256 by using V-notched bars ¼ inch thick as test specimens. The weather resistance was evaluated from the difference ΔE between the color of test specimens subjected to a 1000 hours' accelerated exposure test at 63° C. by using a Sunshine Weather-O-Meter and that of the test specimens unexposed. The heat stability was evaluated from the difference ΔE between the color of test specimens after 48 hours' heating in a Geer oven at 150° C. and that of the test specimens before heating. The moldability was evaluated by operating an injection molding machine model M-100 supplied Meiki Seisakusho Co., Ltd. at a cylinder temperature of 260° C., mold temperature of 60° C., and injection pressure of 50 kg/cm² G, and measuring the length (expressed in mm) of flow path in a cavity 1 mm thick and 10 mm wide.

As are evident from Table 3, molded articles obtained from the compositions of the present invention exhibit excellent low-temperature impact resistance and have weather resistance which is superior to that of molded articles from the composition of Comparative Example 9 containing a butadiene rubber-based graft copolymer and is equivalent or superior to that of molded articles from the composition of Comparative Example 10 containing an acrylic rubber-based graft copolymer. In addition, the compositions of the invention prove to be superior also in moldability to those of comparative examples and hence best suited for large molded articles.

TABLE 3

| | | | Example 8 | Example 9 | Example 10 | Comparative Example 9 | Comparative Example 10 | Comparative Example 11 |
|---|---|---|---|---|---|---|---|---|
| composition (parts) | Polycarbonate resin | | 60 | 60 | 60 | 60 | 60 | 60 |
| | Polytetramethylene terephthalate | | 20 | 25 | 20 | 20 | 20 | 40 |
| | Polyorganosiloxane-based graft copolymer | Graft copolymer S-1 | 20 <12%> | | 10 <16%> | ABS-1 (Bd 60%) 20 | AAS-1 (Acrylic rubber 60%) 20 | — |
| | | Graft copolymer S-2 | | 15 <9%> | | | | |
| | AS resin | | | | 10 | | | |
| Results of evaluation | Izod impact strength, (notched bar ¼" thick) (kg · cm/cm) | at 23° C. | 61 | 58 | 58 | 59 | 60 | 5.2 |
| | | at −30° C. | 40 | 22 | 24 | 32 | 5 | 4 |
| | Weather resistance (ΔE) | | 14.0 | 14.9 | 14.7 | 30.5 | 14.5 | 13.8 |
| | Heat stability (ΔE) 150° C. × 48 hr | | 2.2 | 2.4 | 2 | 5.1 | 2.3 | 2 |
| | Moldability | | 54 | 56 | 60 | 47 | 49 | 40 |

TABLE 3-continued

|  | Example 8 | Example 9 | Example 10 | Comparative Example 9 | Comparative Example 10 | Comparative Example 11 |
|---|---|---|---|---|---|---|
| (length of flow path, mm) | | | | | | |

Figures in brackets < > indicate each the polyorganosiloxane rubber content (%) in the whole resin composition. The same applies hereinafter.

EXAMPLES 11-14 AND COMPARATIVE EXAMPLES 12 AND 13

These examples illustrate another superior feature of the present inventive composition. According to the procedure of Example 8, compositions of the present invention were prepared by compounding ingredients in proportions as shown in Table 4. These compositions were injection molded (cylinder temperature 260° C., mold temperature 60° C.) into test specimens (1/12" thick × ½" wide × 5" long), which were subjected to the above stated cantilever test to evaluate the chemical resistance.

A thinner supplied by Nippon Paint Co., Ltd. for automotive urethane paints was applied on a portion abutting against the fulcrum, of the test specimen, a load of 150 g was put on a position 35 mm distant from the fulcrum, and the time (minutes) to the break was measured. Results of the test are also shown in Table 4.

In Table 4, the polycarbonate resin, polytetramethylene terephthalate, and AS resin are the same as used in Examples 8-10 and the polyorganosiloxane-based graft copolymers are S-1 and S-3, Polyester elastomers used are a polytetramethylene terephthalate-polytetramethylene oxide block copolymer containing 35% by weight of polytetramethylene oxide segments of molecular weight about 1200 and an aromatic polyester-aliphatic polyester block copolymer (supplied by Toyobo Co., Ltd. under the tradename of Pelprene S-2000).

As are evident from Table 4, the compositions of the present invention exhibit excellent chemical resistance.

TABLE 4

|  |  | Example 11 | Example 12 | Example 13 | Example 14 | Comparative Example 12 | Comparative Example 13 |
|---|---|---|---|---|---|---|---|
| Composition (parts) | Polycarbonate resin | 75 | 75 | 75 | 60 | 75 | 75 |
| | Polytetramethylene terephthalate | 4 | | | 10 | 4 | 4 |
| | Polyester-polyether block copolymer | | 4 | | 10 | | |
| | Aromatic-Aliphatic block copolyester | | | 4 | | | |
| | Polyorgano siloxane-based graft copolymer S-1 | 9 (5.4%) | 9 (5.4%) | | 20 (12%) | ABS-1 9 | AAS-1 9 |
| | Polyorgano siloxane-based graft copolymer S-3 | | | 9 (5.4%) | | | |
| | AS resin | 12 | 12 | 12 | | 12 | 12 |
| Evaluation result, chemical resistance (min.) | | 15.5 | 14 | 15 | >30 | 2 | 2.5 |

EXAMPLES 15-21 AND COMPARATIVE EXAMPLE 14

According to the procedure of Example 8, compositions of the present invention were prepared by compounding a polycarbonate resin having molecular weight of about 22,000, polytetramethylene terephthalate having an intrinsic viscosity [η] of 1.08, polyethylene terephthalate having an intrinsic viscosity [η] of 0.72, polyorganosiloxane-based graft copolymer S-1, the same AS resin as used in Example 10, and methyl methacrylate-styrene copolymer (MS resin) containing 42% of styrene, in proportions as shown in Table 5.

The Rockwell hardness shown in Table 5 was measured by using R scale in accordance with ASTM D-785. Compositions of the present invention prove to have excellent properties as well as high hardness and stiffness.

TABLE 5

|  |  |  | Comparative Example 14 | Example 15 | Example 16 | Example 17 | Example 18 | Example 19 | Example 20 | Example 21 |
|---|---|---|---|---|---|---|---|---|---|---|
| Composition (parts) | Polycarbonate resin | | 90 | 90 | 70 | 50 | 30 | 20 | 10 | 10 |
| | Polyester | Polytetramethylene terephthalate | 10 | 5 | | 40 | 50 | 60 | 80 | 50 |
| | | Polyethylene terephthalate | | | 15 | | | | | |
| | Graft copolymer S-1 | | | 1 <0.6%> | 10 <6%> | 10 <6%> | 20 <12%> | 20 <12%> | 10 <6%> | 40 <14%> |
| | Vinyl polymer | | | AS resin 4 | MS resin 5 | | | | | |
| Izod impact strength (V-notched bar ¼" thick) (kg · cm/cm) | at 23° C. | | 6.5 | 12.3 | 55 | 61 | 73 | 38 | 12.5 | 78 |
| | at −30° C. | | 3.8 | 5.5 | 28 | 22 | 25 | 16.5 | 6.1 | 31 |
| Rockwell hardness, R scale | | | 122 | 122 | 115 | 115 | 109 | 108 | 112 | 90 |

According to the present invention, there has been provided a resin composition unprecedentedly excellent in impact resistance, weather resistance, heat stability, and further in chemical resistance and moldability, which comprises a blend of a polycarbonate resin with a polyorganosiloxane-based graft copolymer or additionally contains a polyester polymer. This composition has beneficial effects when molded products therefrom are used under harsh conditions such that automotive interior and exterior materials may be exposed to. The heat resistance, stiffness, etc. of the composition can be further improved by incorporating a reinforcement such as glass fiber or the like into the composition.

What is claimed is:

1. A polycarbonate resin composition comprising either a polycarbonate resin (A) or a mixture (A') of the polycarbonate resin and one of a saturated polyester, a polyester elastomer, or both a saturated polyester and a polyester elastomer and
   either a siloxane-based graft polymer (B) obtained by graft polymerization of 95 to 10% by weight of at least one vinyl monomer onto 5 to 90% by weight of a polyorganosiloxane rubber or a mixture (B) of the siloxane-based graft copolymer and a vinyl polymer,
   wherein the component (B) is blended so that the content of the polyorganosiloxane rubber exhibits a degree of swelling of 3 to 30 as measured in toluene, has an average particle size of 0.08 to 0.8 μm, and comprises units selected from the group consisting of (I)

(II)

(III)

wherein, $R^1$ denotes methyl, ethyl, propyl, or phenyl, $R^2$ denotes hydrogen or methyl, n denotes a number of 0, 1, or 2, and p denotes an integer of 1 to 6.

2. The polycarbonate resin composition of claim 1, wherein the vinyl polymer in the mixture (B) of the siloxane-based graft copolymer and the vinyl polymer is obtained by polymerizing 70 to 100% by weight of at least one monomer selected from the group consisting of aromatic vinyl monomers, vinyl cyanide monomers, methacrylate monomers, and acrylate monomers and 30 to 0% by weight of a vinyl monomer copolymerizable therewith.

3. The polycarbonate resin composition of claim 1, which comprises the component (A') and the component (B) that is either the siloxane-based graft copolymer or a mixture of the siloxane-based graft polymer and the vinyl polymer and the component (A') is a mixture of 1 to 99 parts by weight of the polycarbonate resin and 99 to 1 part by weight of the saturated polyester, a polyester elastomer or both a saturated polyester and a polyester elastomer.

4. The polycarbonate resin composition of claim 1, which comprises 10 to 90 parts by weight of the component (A) and 90 to 10 parts by weight of the component (B) that is either the siloxane-based graft copolymer or a mixture of the siloxane-based graft copolymer and the vinyl polymer.

5. The polycarbonate resin composition of any one of claims 1, 2, 3, or 4, wherein the polyorganosiloxane rubber comprises units represented by the general formula (I) as defined in claim 1.

6. The polycarbonate resin composition of claim 1, 2, 3, or 4, wherein the vinyl monomer to be graft-polymerized onto the polyorganosiloxane rubber is at least one monomer selected from the group consisting of styrene, α-methylstyrene, acrylonitrile, methyl methacrylate, and butyl acrylate.

7. The polycarbonate resin composition of claim 1, 2, 3, or 4, wherein the polycarbonate resin (A) is formed from starting materials comprising bisphenol A.

8. The polycarbnate resin composition of claim 1, 2, or 3, wherein in the mixture (A') of a polycarbonate and one of a saturated polyester, a polyester elastomer, or both a saturated polyester and a polyester elastomer, the polycarbonate resin is formed from starting materials comprising bisphenol A;
   wherein the saturated polyester is selected from polytetramethylene terephthalate, polyethylene terephthalate, and a mixture thereof; and
   wherein the polyester elastomer is a block copolymer of high-melting polyester segments selected from one of polytetramethylene terephthalate or polyethylene terephthalate, and low-melting polymer segments of molecular weight 400 to 20,000 selected from one of a polyalkylene ether glycol or an aliphatic polyester.

9. The polycarbonate resin composition of claim 1, 2, or 3, wherein the proportion of low-melting polymer segments in the polyester elastomer is from 2 to 80% by weight.

10. A polycarbonate resin composition comprising either a polycarbonate resin (A) or a mixture (A') of the polycarbonate resin and one of a saturated polyester, a polyester elastomer, or both a saturated polyester and a polyester elastomer and
    either a siloxane-based graft copolymer (B) obtained by graft polymerization of 95 to 10% by weight of at least one vinyl monomer onto 5 to 90% by weight of a polyorganosiloxane rubber which exhibits a degree of swelling of 3 to 30 as measured in toluene, contains constitutional units derived from a graft-linking agent,
    wherein the polysiloxane rubber has units represented by any of the general formulae:

(I)

(II)

(III)

wherein, $R^1$ denotes methyl, ethyl, propyl, or phenyl, $R^2$ denotes hydrogen or methyl, n denotes a number of 0, 1, or 2, and p denotes an integer of 1 to 6, as constitutional units derived from a graft linking agent,
and has an average particle size of 0.08 to 0.8 um or a mixture (B) of the siloxane-based graft copolymer and a vinyl polymer,
wherein the component (B) is blended so that the content of the polyorganosiloxane rubber is from 0.5 to 60% by weight based on the whole resin composition.

* * * * *

REEXAMINATION CERTIFICATE (2156th)
United States Patent [19]

Hongo et al.

[11] B1 4,877,831

[45] Certificate Issued  Dec. 21, 1993

[54] POLYCARBONATE RESIN COMPOSITION

[75] Inventors: Masafumi Hongo; Hideyuki Shigemitsu, both of Otake; Naoki Yamamoto, Hiroshima; Akira Yanagase, Otake, all of Japan

[73] Assignee: Mitsubishi Rayon Co., Ltd., Tokyo, Japan

Reexamination Request:
No. 90/002,758, Jun. 19, 1992

Reexamination Certificate for:
Patent No.: 4,877,831
Issued: Oct. 31, 1989
Appl. No.: 62,604
Filed: Jun. 16, 1987

[30]  Foreign Application Priority Data

Jun. 17, 1986 [JP]  Japan ................... 61-140636
Jul. 16, 1986 [JP]  Japan ................... 61-165537

[51] Int. Cl.$^5$ .................. C08L 69/00; C08L 51/08
[52] U.S. Cl. ........................ 525/63; 525/439; 525/446; 525/464
[58] Field of Search ............... 525/63, 439, 464, 446

[56]  References Cited

U.S. PATENT DOCUMENTS

3,864,428  2/1975  Nakamura ..................... 525/67
4,522,979  6/1985  Chung et al. .................. 525/66
4,690,986  9/1987  Sasaki et al. .................. 525/479

FOREIGN PATENT DOCUMENTS

0080767  6/1983  European Pat. Off. .
2376189  7/1978  France .
1590549  6/1981  United Kingdom .

*Primary Examiner*—Ralph H. Dean, Jr.

[57]  ABSTRACT

A polycarbonate resin composition excellent in chemical resistance, weather resistance, heat resistance, and low-temperature impact resistance, which comprises,
  either a polycarbonate resin (A) or a mixture (A') of the polycarbonate resin and a saturated polyester and/or a polyester elastomer and
  either a siloxane based graft copolymer (B) obtained by graft polymerization of 95 to 10% by weight of at least one vinyl monomer onto 5 to 90% by weight of a polyorganosiloxane rubber which exhibits a degree of swelling of 3 to 30 as measured to toluene at 25° C., contains constitutional units derived from a graft-linking agent, and has an average particle size of 0.08 to 0.8 μm or a mixture (B) of the siloxane-based graft copolymer and a vinyl polymer,
  wherein the component (B) is blended so that the content of the polyorganosiloxane rubber may be from 0.5 to 60% by weight based on the whole resin composition.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *